Patented Nov. 5, 1929

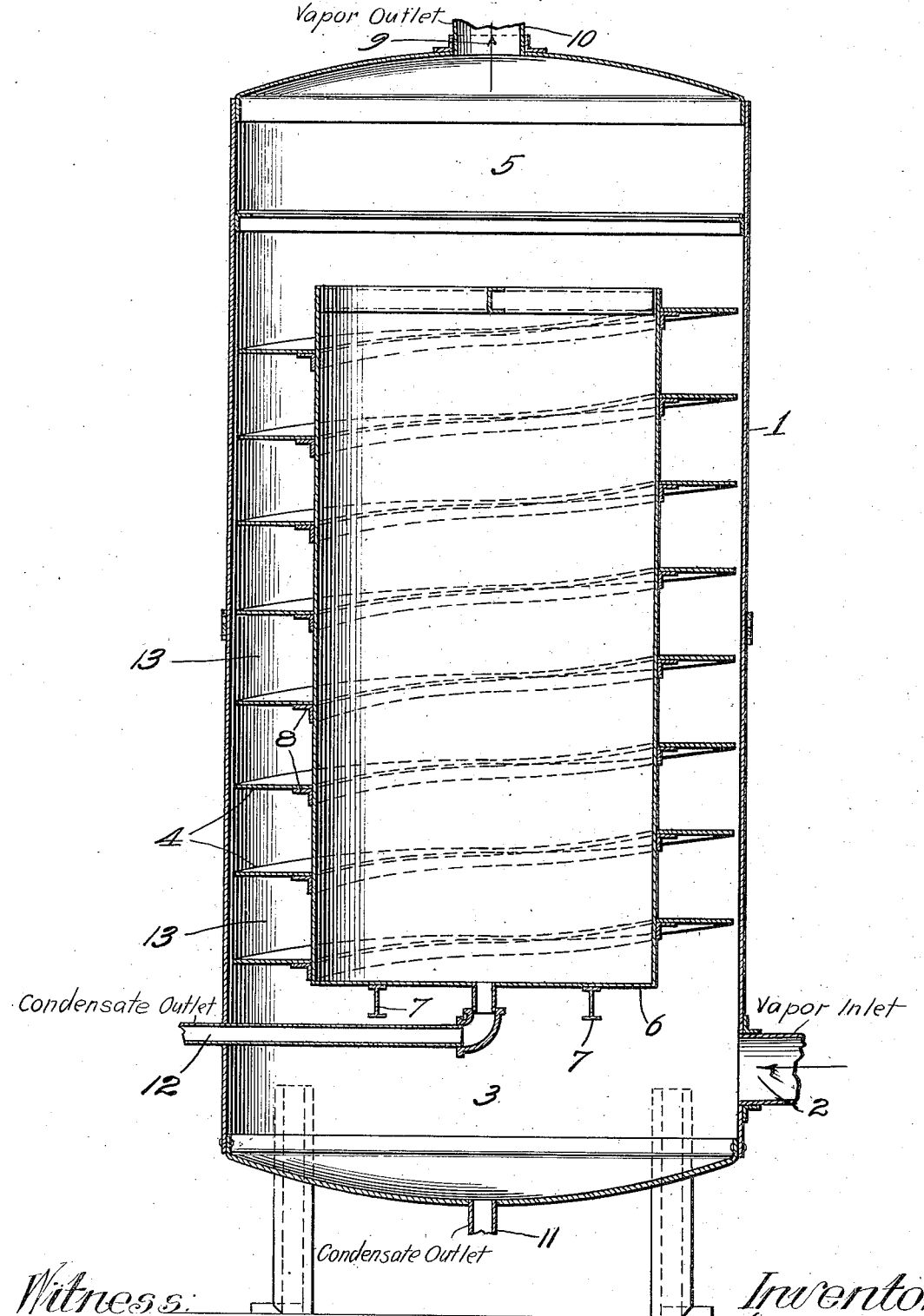

1,734,615

UNITED STATES PATENT OFFICE

WALTER M. CROSS, OF KANSAS CITY, MISSOURI, ASSIGNOR TO CLAYTON OIL AND REFINING COMPANY, OF DALLAS, TEXAS, A CORPORATION OF DELAWARE

DEPHLEGMATOR

Application filed November 14, 1923. Serial No. 674,678.

This invention relates to improvements in dephlegmators, and refers more particularly to a construction for dephlegmating vapors and has application to dephlegmation or refluxing of hydrocarbon oil vapors which have undergone pressure distillation or cracking.

Among the important objects of the invention are to provide a construction in which the oil vapors are directed through a column by a circuitous spiral travel, during which they are at all times in contact with a metallic radiating surface whereby a maximum amount of refluxing may be effected with a minimum size dephlegmator; to provide a construction in which the separated material, such as refluxed condensate and relatively heavier hydrocarbons, may be collected isolated from the vapors.

The single figure is a sectional view of the apparatus, showing the interior construction.

It is understood that this mechanism may be interposed either in a system in which pressure is used or one which is operated under substantially atmospheric conditions. It is only that part of the apparatus covered as this invention that is shown in the drawings. The rest of the system is eliminated for simplicity, as a complete showing would involve unnecessary details well known in the art.

The construction shown involves a shell 1, which is preferably cylindrical in form, and has communicating therewith a vapor line which is connected to the tower or column by the inlet connection 2. The vapors, introduced through the inlet 2, pass into the bottom portion 3 where they rise and are directed in a spiral passage, due to the continuous baffle plate 4 which causes them to pass in a circuitous spiral travel, to a space in the top of the column designated as 5. Centrally of the column is positioned a container 6 open at its top upon the periphery of which the spiral baffle is mounted. The baffle is spaced slightly from the outer shell to facilitate removal in cleaning. The condenser 6 is supported in the column by means of I beam supports 7, while the spiral baffle is attached thereto by means of a spiral angle member 8. The vapors, rising into the upper part of the column 5, pass off through the outlet 9 into a vapor pipe diagrammatically shown at 10.

During the travel of the vapors about the circumference of the container 6, there are separated out certain of the heavier fractions, due to the contact of vapors with the outside surface of the shell 1, which is relatively cooler than the vapors, and causes the heavier fractions to be condensed therefrom. These fractions, in the form of condensate, find their way into the bottom of the shell in the space shown at 3 and may be drawn off as desired through the outlet pipe 11. In a like manner, the condensate separated out from the vapors in the upper portion of the column, will fall back as liquid condensate into the interior or condenser 6 and may be recovered to be recycled or otherwise treated by being withdrawn through the pipe 12. The method of recirculating or retreating these condensates forms no part of the present invention as the novelty lies particularly in the use of a tower in which the vapors are passed therethrough in a manner whereby they are given a miximum reflux action in a minimum amount of space. More specifically, the vapors are passed in a spiral travel about an inner cylindrical container, being at all times in contact with the metallic outside radiating wall of the shell, and due to the spiral baffling members at all times in a turbulent condition which promotes a maximum dephlegmation or refluxing due to the fact that a greater portion of the vapors are brought in contact with a cooler surface. The utilization of a spiral passage gives the effect of a considerably higher tower as the vapors are circulated in the spiral passage whereby they gradually work their way from the bottom to the top of the tower.

In a construction of this character, the speed of the vapors may be increased to a considerably greater extent than in the normal type of construction without entraining any objectionable amount of liquids, due to the relatively dead vapor space 5 above the spiral passage where the entrained liquids will tend to be separated out with a sudden slacking of their speed. The construction may be easily cleaned by removing the inner condenser to which the spiral baffle is attached. This inner core, or condenser, serves also to increase the speed of the vapors by causing them to pass through the constricted passage 13 between the successive spiral tiers of the baffle. In addition to the advantages named, the construction is simple and cheap of construction in addition to its being efficient in operation. It is also easily cleaned and admirably adapted to the purpose for which it is used, that is, the separation of the heavier from the lighter fractions in the treatment of petroleum hydrocarbons.

I claim as my invention:

1. A dephlegmator of the character described, having inlet and outlet ports, an open top container of less diameter than the dephlegmator shell positioned therein, separate condensate draw off pipes from the inner container and outer shell, a continuous spiral baffle plate affixed to the periphery of the inner container, the said baffle being spaced from the outer shell and out of contact therewith.

2. A dephlegmator of the character described having inlet and outlet ports, an open top container of less diameter than the dephlegmator shell positioned therein, separate condensate draw-off pipes from the inner container and outer dephlegmator shell, and a spiral baffle in the annular space between the inner container and the outer shell, said baffle attached to the inner container and removable therewith, and forming an annular helicoidal space for the passing of the rising vapors, said baffle being spaced from the outer shell and out of contact therewith.

WALTER M. CROSS.